United States Patent
Hus et al.

(10) Patent No.: US 6,926,856 B2
(45) Date of Patent: Aug. 9, 2005

(54) MOLDED PARTS WITH FABRIC SURFACE AREAS AND PROCESSES FOR THEIR PRODUCTION

(75) Inventors: Michael E. Hus, Midland, MI (US); Joseph A. Langmaid, Caro, MI (US); Curt E. Peterson, Midland, MI (US); Jeffrey D. Wenzel, Saginaw, MI (US)

(73) Assignee: Dow Global Technologies Inc.

( * ) Notice: Subject to any disclaimer, the term of this patent is extended or adjusted under 35 U.S.C. 154(b) by 342 days.

(21) Appl. No.: 10/208,617

(22) Filed: Jul. 29, 2002

(65) Prior Publication Data

US 2004/0018337 A1 Jan. 29, 2004

(51) Int. Cl.$^7$ .......................... B29C 45/14; B29C 45/16
(52) U.S. Cl. ................................ 264/257; 264/328.8
(58) Field of Search ...................... 264/257, 328.8, 264/259

(56) References Cited

U.S. PATENT DOCUMENTS

| | | | |
|---|---|---|---|
| 2,821,764 A | | 2/1958 | Leahy et al. |
| 4,017,656 A | | 4/1977 | Lasman et al. |
| 4,805,272 A | | 2/1989 | Yamaguchi |
| 4,849,145 A | | 7/1989 | Hirsch |
| 5,006,188 A | | 4/1991 | Usui et al. |
| 5,034,173 A | * | 7/1991 | Altman et al. ............... 264/102 |
| 5,053,179 A | | 10/1991 | Masui et al. |
| 5,395,668 A | | 3/1995 | Ito et al. |
| 5,444,183 A | | 8/1995 | Gehrs et al. |
| 5,715,966 A | | 2/1998 | Nagano et al. |
| 6,004,498 A | * | 12/1999 | Fujii et al. ................... 264/255 |
| 6,132,669 A | * | 10/2000 | Valyi et al. .................. 264/510 |
| 6,342,176 B2 | * | 1/2002 | Goto et al. .................. 264/255 |
| 2001/0042946 A1 | | 11/2001 | Schlieber et al. |
| 2002/0171169 A1 | | 11/2002 | Chuang |

FOREIGN PATENT DOCUMENTS

| | | |
|---|---|---|
| DE | 1018365 B | 10/1957 |
| DE | 3733287 A | 4/1969 |
| DE | 40 15 071 A1 | 11/1991 |
| DE | 4120133 A | 12/1992 |
| DE | 4228283 A | 4/1994 |
| DE | 19937027 A | 3/2001 |
| DE | 10 00 1229 | 9/2001 |
| EP | 0475198 A | 3/1992 |
| EP | 0517615 A | 12/1992 |
| EP | 0629481 A | 12/1994 |
| EP | 1 157 799 A1 | 11/2001 |
| EP | 1291146 A | 3/2003 |
| GB | 1075702 A | 7/1967 |
| GB | 2008022 A | 5/1979 |
| JP | 57-29436 | 7/1980 |
| JP | 54-18039 | 8/1980 |
| JP | 66-1214 | 1/1981 |
| JP | 59209115 | 11/1984 |
| JP | 63067131 | 3/1988 |
| NL | 6701661 A | 10/1967 |
| WO | 9609160 A | 3/1996 |
| WO | D1/74583 | 10/2001 |

OTHER PUBLICATIONS

Knoblauch M et al, Umspritzen Schafft Den Durchbruch, Oct. 1999, vol. 40,pp. 40–41, Isernhagen, Germany (XP000866922, English Translation Included).

\* cited by examiner

*Primary Examiner*—Michael P. Colaianni
*Assistant Examiner*—Monica A. Fontaine

(57) ABSTRACT

The present invention thus provides a fabric-laminated plastic part and a novel process where the fabric edges are covered with a second plastic component that adheres both to the fabric and to the first plastic material. A first plastic substrate component is prepared with an adhered fabric surface area and then the edges of the fabric are overlapped by a second molded-on, plastic edge-covering component. The second material covers the fabric edge to provide an aesthetically pleasing surface. This construction produces a more durable fabric edge covering and eliminates the tendency of the fabric to peel off the molded part during use.

9 Claims, 3 Drawing Sheets

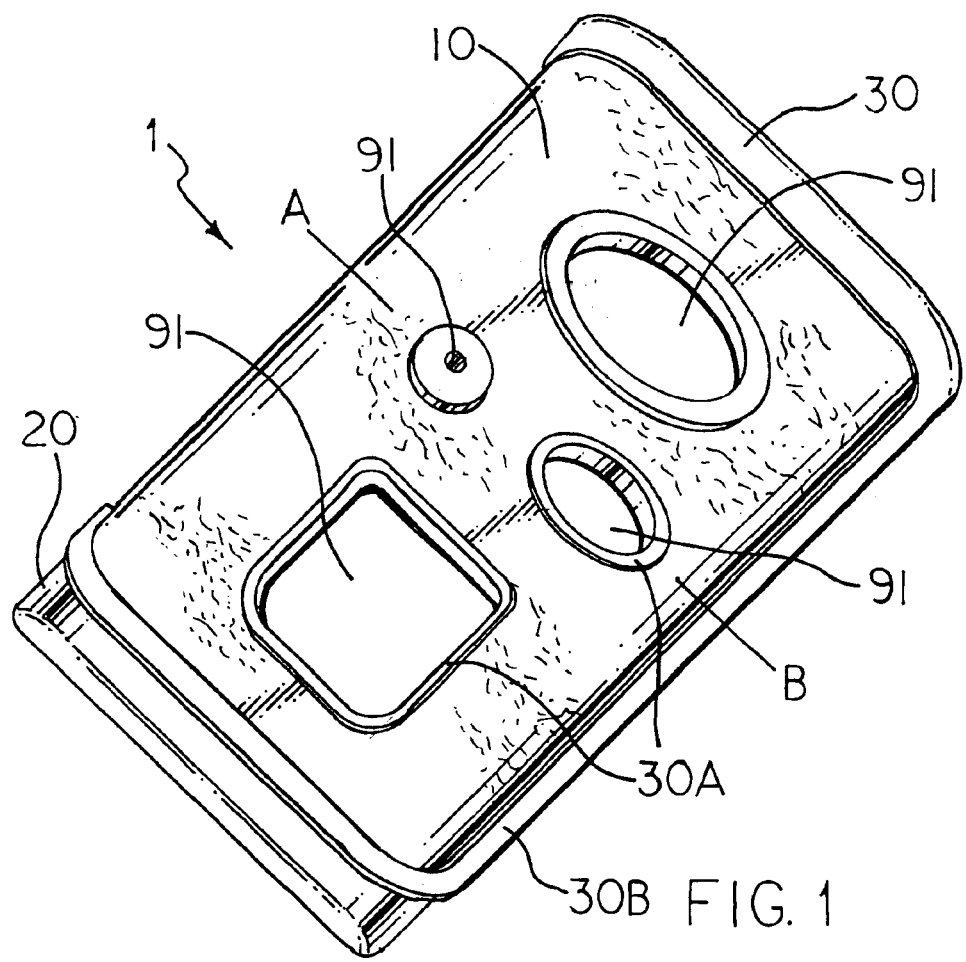
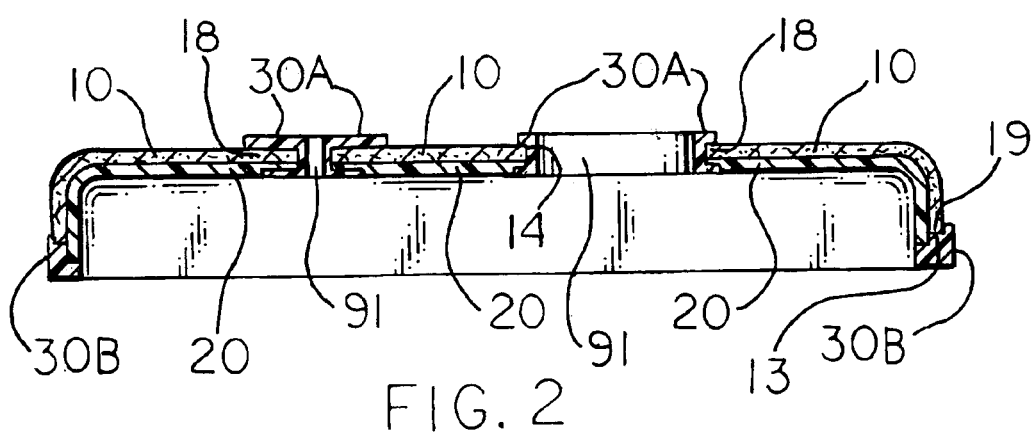

MOLDED PARTS WITH FABRIC SURFACE AREAS AND PROCESSES FOR THEIR PRODUCTION

This invention relates to injection molded plastic parts having a fabric surface area and a process for making these parts where the fabric edges are secured in a very effective and aesthetically pleasing manner. Parts are produced with good appearance, precise dimensions, thin part cross section and stable, secure fabric edge coverings.

BACKGROUND OF THE INVENTION

There are a number of processes for providing a surface layer of a fabric, such as leather or simulated leather, onto all or part of the surface of molded plastic parts. Using an injection molding process and pre-inserting a fabric surface piece in front of or into the mold is discussed in JP 54-018,039; JP 57-029,436; DE 4,015,071; EP 1,157,799; and U.S. Pat. No. 4,849,145.

In JP 54-018,039 a fabric is held in the mold and forced against the opposite side of the mold cavity by injected plastic. DE 4,015,071 and JP 57-029,436 teach the use of a film between the fabric and the injected, molten plastic. In EP 1,157,799 a fabric is laminated initially to a formable thermoplastic foil and then a preform is prepared by generally shaping the laminated material, for example by deep drawing, to correspond generally to the finished part design. Then the preform is inserted into the injection mold where the molten plastic is injected and the fabric/foil laminate preform forms all or part of the outer surface of the finished part. However, none of these mention any technique for securing and covering the fabric edges.

In U.S. Pat. No. 4,849,145 leather fabric surfaces are provided on molded plastic parts. In this reference the injected plastic that forms the part is intended to flow to the edges of the inserted fabric piece to abut and seal the peripheral edges of the leather fabric. It has been found, however, that this process results in poor part appearance because the fabric edge is not consistently covered by the injection molded plastic. The resulting fabric/plastic interface or edge that is visible on the part surface is at least partly open and/or irregular. Thus, any of these methods requires subsequent process steps to cut or trim the fabric and/or to cover the edges in some fashion to provide secure and aesthetically pleasing fabric edges. The attachment and use of a separate trim piece is not acceptable because it requires multiple pieces and assembly steps to obtain an acceptable appearance and these additional pieces require greater part thickness and space. This process also results in a trim piece that is more easily separated from the fabric surface. The problems with the fabric edges are especially pronounced in fabrics that are more easily compressed in the first injection step and expand significantly after the first molding cavity is removed.

SUMMARY OF THE INVENTION

In one embodiment the present invention is a molded plastic article having a plastic substrate component with an adhered fabric surface piece where at least part of the fabric edges and fabric surface area adjacent the edges are overlapped by a molded-on, plastic edge-covering component. Preferably the molded-on, edge-covering component is an injection or compression molded plastic piece and more preferably it is selected from the group consisting of thermosetting polyurethane, thermosetting epoxy, thermosetting silicone, and the thermoplastics polycarbonate ("PC"), ABS, polypropylene ("PP"), high impact polystyrene ("HIPS"), polyethylene ("PE"), polyester, polyacetyl, thermoplastic elastomers, thermoplastic polyurethanes ("TPU"), nylon, ionomers, polyvinyl chloride ("PVC") and blends of two or more of these thermoplastics. This invention is especially applicable to molded articles where the fabric is a synthetic leather or suede and/or the fabric has voids or openings and interior fabric edges. In an alternative embodiment the present invention is a process for preparing a molded plastic article of this type where an edge-covering component is molded onto and overlaps at least part of the fabric edges and fabric surface area adjacent the edges of a substrate component having an adhered fabric material. Preferably the edge-covering component which overlaps the edges of the fabric piece is molded on by injection or compression molding or by reaction injection molding in a second molding step. In a preferred process of this type the second molding step uses a flow leader effect with (a) a main flow leader cavity for the edge-covering plastic component material which main flow cavity is generally around and outside the area of the peripheral fabric edges and (b) a fabric edge cavity that receives a flow of the edge-covering material in a direction that is generally not parallel to the peripheral edges of the fabric.

The present invention thus provides a better fabric-laminated plastic part and a novel process and part design where at least part and preferably all of the fabric edges and surface area adjacent the edges (i.e., the fabric surface area at least 0.1, preferably at least 0.2 millimeters in from the edges) are covered with a second, molded-on plastic that adheres both to the fabric and to the first plastic material. The fabric piece can be selected from a wide range of fabric types and precut, stamped and/or shaped to desired size. The fabric is adhered to a first plastic substrate component to provide a fabric-laminated substrate or subassembly (preferably in an injection molding step) and a second material is molded on to cover the fabric edge and provide an aesthetically pleasing and durable fabric edge covering. Proper selection of the combination of the first plastic substrate material, fabric and second molded-on edge-covering material provides the necessary adhesion to prevents the fabric or edge-covering material from delaminating or peeling off the molded part during use.

BRIEF DESCRIPTION OF THE DRAWINGS

FIG. 1 is a perspective view of the front side of a sample part prepared according to the invention.

FIG. 2 is a cross sectional view of a sample part prepared according to the invention taken across the line A–B in FIG. 1.

DETAILED DESCRIPTION

Figure 3:
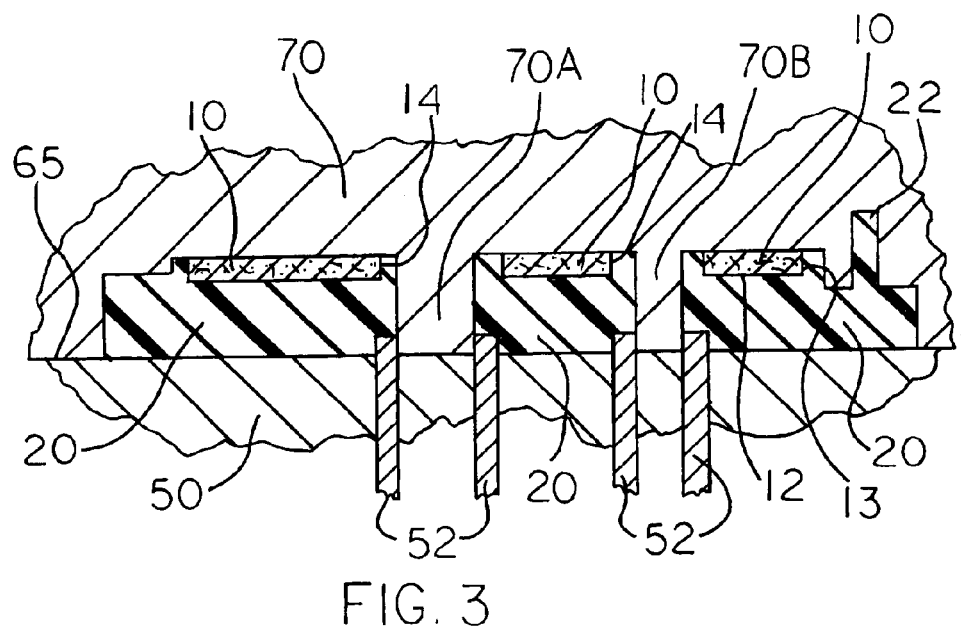
FIG. 3 is a cross sectional view of the first component molding step.

The FIG. 1 perspective view and FIG. 2 cross sectional view (taken at line AB) of a sample part prepared according to the invention (1) show the fabric surface piece (10) with peripheral fabric edge areas (19) at the outer edges of the fabric surface piece and optional interior fabric edge areas

(18) where there may be openings or holes in the fabric surface piece to correspond with openings, holes or other design features at corresponding locations in the plastic part and. Also shown in FIG. 1 is the first or substrate component (20), in this case extending beyond the fabric-covered surface area and not entirely covered by fabric, and the second molded-on, edge-covering component (30). This component is shown as 30B at the fabric peripheral edge areas (19) and as 30A at the at the fabric interior edge areas (18), if any. There are voids or openings in the part (91) of various shapes and sizes.

FIG. 3 is a cross sectional view of a first molding step and forming of the first substrate component according to the invention. In this figure first mold part (50), which can be referred to as the "core", has the second mold part (70), which can be referred to as the first "cavity", closed against it. This creates an interface parting line (65). The fabric surface piece (10) was placed in the mold and the first component plastic material (20) has been injected. As can be seen there are going to be two voids or openings in this area of the finished plastic part (and in the corresponding locations in the fabric piece), the openings corresponding to and being formed by areas 70A and 70B of the second mold part. The precut fabric piece (10) had initially been located in the second mold part and the fabric surface that will be on the finished part surface (11) is held against the inside of the mold by a vacuum source (not shown). The molten plastic material for the substrate or first component had been injected into the mold through an injection gate (not shown) at a rate and pressure sufficient to fill the mold, completely cover the fabric piece, compress the fabric piece against the mold surface and adhere the plastic to the back side of the fabric piece (12). The injected plastic material will also generally cover the compressed thicknesses of the peripheral edges of the fabric (13) and the interior edges of the fabric (14) at the openings or voids.

In FIG. 3 the use of a flow restrictor (22) is also shown, for example purposes, only on one side of the part. As discussed below, the use of a flow restrictor is one method that can be used to facilitate the proper flow of the second component plastic material over the fabric peripheral edges (13) when the edge-covering component is added. Optional "core back" mold sections (52) are shown projected in FIG. 3 during first component molding step (and retracted in FIG. 4 for second component molding). In a preferred embodiment of the present invention, when these sections are then retracted prior to the second molding step, there are molded-in flow channels located in the back side of the first substrate material that can then provide space for the plastic material to flow and conduct the molten second, edge-covering material from the injection gate. As discussed further below, this technique of using molded-in flow channels makes it easier to provide molded-on edge-covering components at multiple interior fabric edges (14) with out actually removing the intermediate molded piece from the first mold part ("core"). This is also a very advantageous mold and part design to use in combination with properly located "impingement" surfaces for the second molding step according to another preferred embodiment of the present invention. These flow channels provide a flow of second component plastic that comes generally from behind the substrate and then can be directed to hit "impingement" surfaces on the mold that are generally opposite the fabric surface and edge. These impingement surfaces are then a preferred technique to direct the plastic flow onto the fabric edge from a direction that is generally perpendicular to the fabric surface (as opposed to a generally parallel flow) as will be discussed further below.

Figure 4:
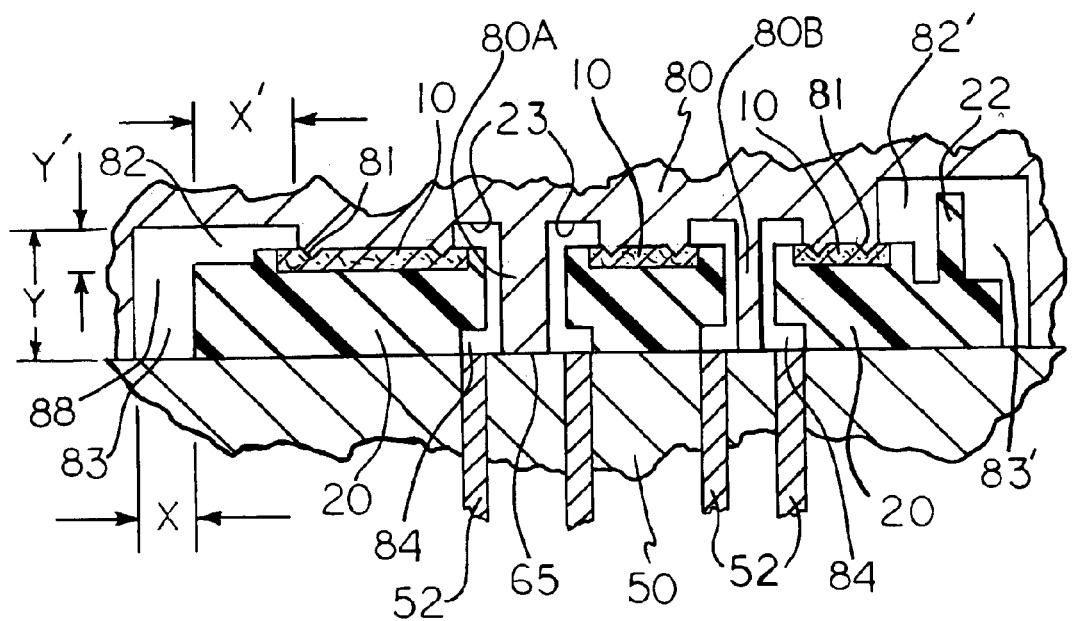
FIG. 4 is a cross sectional view of the second component mold.

FIG. 4 is a cross sectional view of the mold configuration prior to a second molding step and prior to forming of the second substrate component according to the invention. In this figure the second mold part has been removed and replaced by a third mold part (80) (which can be referred to as the "second cavity") which is similarly closed against the first mold part (50) creating an interface parting line (65). As can be seen, the first component with fabric surface area has remained located on the first mold part. As can be seen areas 80A and 80B of the third mold part will form the two openings in the finished plastic part. The "core backs" (52) have been retracted back into the core mold part to form flow channels (84) for the second molding material. There are typically further molded-in flow channels (shown in FIG. 6 and discussed further below) that connect the main injection point(s) to interior fabric edge locations and the molded-in flow channels (84) that are shown in this figure that provide a material flow around the openings and to the interior fabric edges.

As can be seen on the left side of the molding configuration shown in FIG. 4 and discussed further below, for the second, edge-covering component, a part/mold design preferably used according to the present invention uses a non-uniform thickness for the open cavity (88) which results in a non-uniform thickness of the resulting part wall. This is done to provide a larger cross-sectional flow area (shown as 83 with dimensions X and Y) as a "flow leader" and a smaller fabric edge cavity section (shown as 82 with dimensions X' and Y'). In this way the injected molten plastic initially flows generally circumferentially around the perimeter of the fabric piece but removed from the peripheral fabric edge/interface to fill a large portion of the cavity volume. It was found that the cross-sectional area of the of the flow leader (X times Y) needs to be at least 10% greater than that of the cavity area at and over the fabric edge cavity (X' times Y') in order to obtain these benefits and reduce fabric "stripping" as will be discussed further below.

In FIG. 4 a "flow restrictor" (22) is also shown molded into the first component, for illustration purposes, molded only on the right side. Flow restrictors can be used to further narrow and restrict the flow path of the molten resin as it goes to the area of the fabric peripheral edges. As discussed further below, a "flow restrictor" creates a flow leader effect and guides the second molding material initially along the channel (83') and then over the restriction, into the edge cavity area (82') and onto the top of the fabric in a more perpendicular direction relative to the plane of the fabric surface. The height of the flow restrictor relative to the fabric in the fabric edge cavity needs to be sufficient that the fabric is protected from the flow and shear as the main body of molten plastic flows in the flow leader or main flow channel area of the cavity (83') in a generally parallel direction. In this way the plastic flow forces in the fabric edge cavity (82' in FIG. 4) will not separate or delaminate the fabric from the substrate and/or internally delaminate the fabric itself.

The mold shown in FIG. 4 is also configured to provide plastic flow onto interior fabric edge areas around the openings from molded-in flow channels (84) on the back of the first component in a generally perpendicular direction off of an impingement surface (23). The mold part (80) is also designed to conform and fit tightly against the fabric surface area and/or is preferably provided with "crush ribs" (81) between the second component cavity area and fabric surface area to prevent any of the second molding material from "flashing" outside of the intended cavity area and forming a layer or piece that lies between the fabric and the second cavity (on the fabric surface of the finished part) and creating a surface flaw on the fabric surface when the part is removed from the mold.

Figure 5:
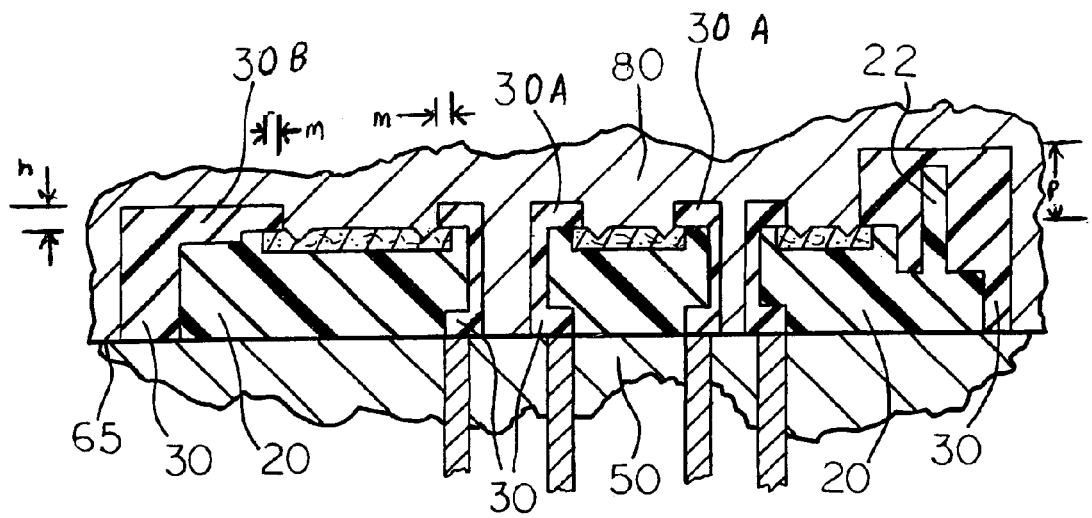
FIG. 5 is a cross sectional view of the second component molding step.

FIG. 5 is a cross sectional view of the mold configuration during the second molding step and after injection of the second substrate component plastic material. As can be seen, the second component material (30) has been injected, filled all of the flow channels and, where shown as 30A, covered and secured the fabric at the peripheral edge areas and, where shown as 30B, covered and secured the fabric at the interior edge areas.

Figure 6:
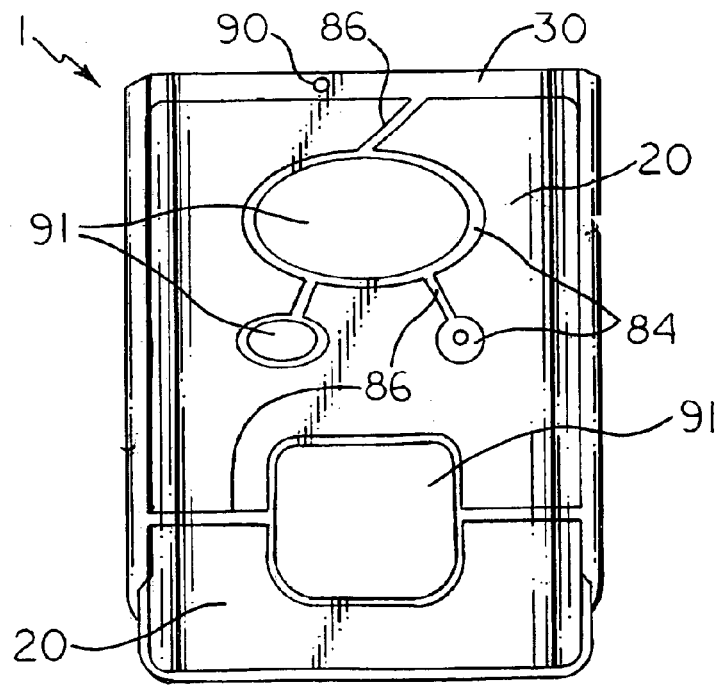
FIG. 6 is a perspective view of the back side of a sample part prepared according to the invention.

FIG. 6 is a perspective view of the back side of a sample part prepared according to the invention (1). In particular, it shows the first substrate component (20) with the holes, voids or openings (91) and the presence of the flow channels (84 and 86) which have been filled with the second, edge-covering component plastic material. As mentioned, the molded-in flow channels were molded into the first component and, during molding of the second component, allow the second plastic material to flow along the back side of the part to the locations of the openings and corresponding fabric edge areas on the front side of the part. As mentioned above, some of these molded-in channels (84) allow the second plastic material to flow around the openings and outward to form the interior edge-covering component at the part surface on the front side and some channels (86) allow the material simply to reach those openings from a single injection point or gate. In FIG. 6 these channels were filled with second component material that flows from the injection gate (90), around the outer flow channels (83) and through the molded-in flow channels (86). As discussed further below, the material flow from inner channels (84) advantageously directs the second component material flows against the impingement surfaces of the second mold cavity and into the interior edge-covering cavities with less turbulence and shear to tear, move or distort the fabric edges. Using a preferred impingement surface configuration in the flow channel coming from the molded-in flow channels directs the second material to flow onto the top of the fabric and covers the edges from a direction generally not parallel to the plane of the fabric.

The plastic articles according to the present invention can be prepared using known multi-component molding techniques. A preferred multi-component molding technique (also referred to as two-shot injection molding) is usually accomplished by preparing a first molded component ("first shot") having an adhered or laminated fabric surface piece between at least two mold parts (usually referred to as a "core" and a "cavity"), leaving the molded first component or intermediate in (or on) one of the mold parts (the "first mold part") and then either (a) moving in at least one different mold part, (b) moving the first mold part to a position opposing a different mold part, or (c) the use of sliding or movable section in the mold to provide a further cavity. In this way a second cavity is formed corresponding to the desired molded-on, edge-covering component, and filled with the desired plastic material.

An alternative multi-component molding technique (also referred to as insert injection molding) is usually accomplished by initially molding a first molded component or intermediate ("first shot") having an adhered or laminated fabric surface piece in one set of mold parts, removing this intermediate component part and transferring it to a second set of mold parts for injection molding the second component. The second mold is designed is such a way that it comes in contact with the first molded component as needed to form a cavity corresponding to the desired molded-on, edge-covering component.

Plastic Substrate Component with Adhered Fabric Piece

As mentioned above, this first or substrate component can be prepared by generally known molding techniques that are suited to provide the necessary plastic substrate or base part having the fabric surface piece properly located and sufficiently adhered. A preferred molding technique is injection molding by preparing pre-cut fabric piece that can be properly located and sufficiently fixed to an inner mold surface in an injection molding mold during the injection molding process. In the injection molding step molten plastic is injected into the mold, filling the mold, conforming the fabric piece to the mold shape and simultaneously laminating or bonding the fabric piece to the plastic. As will be discussed further below, the fabric piece can have a backing layer that facilitates the step or process of adhesion/lamination to the substrate component. Other suitable processes for forming the substrate and/or attaching the fabric include compression molding, radio frequency (RF) welding, sonic welding, thermoforming, injection compression molding, gas assist injection molding, structural foam injection molding, microcellular foam molding technology, laminar injection molding, water injection molding, external gas molding, shear controlled orientation molding, and gas counter pressure injection molding.

Thermosetting or thermosetable plastics can also be employed to similarly prepare the fabric-laminated plastic substrate component using known techniques for reaction injection molding or resin transfer molding.

The mold surface of any of the mold parts can be textured to any known surface finish that is desired for either the exposed portion of the fabric surface piece, the appearance or texture of the exposed portions of the plastic material or provide a desired surface for subsequently attaching or affixing either the fabric surface piece or molded-on edge-covering component. Then, during the injection step the plastic enters the mold, filling the mold, conforming the fabric piece to the mold shape and imparting the mold surface/grain/texture onto the fabric or substrate material surface.

In general, the first substrate component can be prepared from a broad range of plastic materials including thermoset plastics such as polyurethane, epoxy or thermosetting silicone and thermoplastics such as polycarbonates ("PC"), ABS, polypropylene ("PP"), high impact polystyrene ("HIPS"), polyethylene ("PE"), polyester, polyacetyl, thermoplastic elastomers, thermoplastic polyurethanes ("TPU"), nylon, ionomer (e.g., Surlyn), polyvinyl chloride ("PVC") and including blends of two or more of these thermoplastics such as PC and ABS. These materials may contain pigments, additives and/or fillers that contribute any needed cost and/or performance features such as surface appearance, ignition resistance, modulus, toughness, EMI shielding and the like. The plastic material of the first plastic substrate component may be the same as or different than that used in the second, edge-covering component and hence may or may not be readily identifiable or distinguishable from that of the second component after the final molded article is prepared. This depends upon whether there is a detectable boundary between the two plastic materials.

A wide range of fabric materials can be used for the fabric surface area of this invention. This is a tremendous advantage of the parts and process that are provided according to the present invention. The suitable fabric materials include but are not limited to: natural and synthetic leathers (including both leathers and suedes) and any types of textiles or textile-like materials such as, woven, non-woven, and knit fabrics from natural or synthetic fibers/materials including coagulated polyurethane laminates, PVC and other rigid or flexible film or sheet materials. The suitable "fabrics" may include laminates and structures combining two or more of these and the use of one or more of these with an adhered "backing material". "Backing materials" are sometimes included on the fabrics that can be obtained and used or can be added if needed to adhere better to the substrate, stiffen the fabric and/or prevent the molding plastic from being excessively forced into or through the back of the fabric. Backing materials can include a wide range of natural or synthetic materials or textiles including woven, nonwoven, and knit fabrics from natural or synthetic fibers/materials; films, foams or sheets of a plastic such as PC, PET, PBT, ABS, PA6,6, PP, HIPS, and blends of two or more of these materials.

In one embodiment of the present invention, a foam layer can advantageously be included as a backing material for the fabric piece or an intermediate layer between the fabric surface piece and the substrate material. When using a compressible type of foam, this can provide or enhance the soft or cushioned feel of the fabric surface. This layer can be present on the fabric that is supplied for use or can be laminated to a fabric either prior to or during the molding/lamination of the substrate. In general, the foam can be open or closed cell and needs to be sufficiently heat resistant to retain its desired properties during the subsequent processing steps, for example not melting or collapsing to an unacceptable degree. Suitable foam densities are in the range of from about 5 to about 95 kilograms per cubic meter ($kg/m^3$), preferably from about 20 to about 75 $kg/m^3$, depending upon their layer thickness and degree of cushion or compression that is desired. The plastic material used in the foam can be a thermoset or thermoplastic and preferred foam plastic layers include a foamed thermoset polyurethane.

Bonding of the backing material to the fabric can be achieved by flame lamination, adhesive bonding, electromagnetic radiation bonding, or thermally initiated adhesive such as Dow Adhesive Film. As may be needed for facilitating fabrication of the part design, the fabric surface piece with optional backing can be cut, stamped out, shaped, formed and/or preformed by known techniques such as the known deep drawing processes for preparing pre-formed shapes to be inserted into the mold. Depending upon the design of the finished article, there can obviously be different fabric types used in different surface sections of the article.

In general, the combinations of fabric and the first (and second) component plastic material are selected to obtain sufficient adhesion between them. The adhesion between fabric surface piece and first component is such that the fabric is not readily removed from the part during the subsequent processing and handling to mold on the edge-covering layer. The adhesion between the second, edge-covering layer and the fabric and first substrate component is critical to maintain a finished part where the two components and/or the fabric cannot be easily separated during subsequent assembly of a finished product employing the fabric-surfaced molded structure or during the use of the finished product where fabric-surfaced molded structure is a part or an enclosure.

Molded-On Edge-Covering Component

In general, like the first substrate component, the molded-on edge-covering component can be prepared from a broad range of plastic materials including thermoset plastics such as polyurethane, epoxy or thermosetting silicone and thermoplastics such as polycarbonates ("PC"), ABS, polypropylene ("PP"), high impact polystyrene ("HIPS"), polyethylene ("PE"), polyester, polyacetyl, thermoplastic elastomers, thermoplastic polyurethanes ("TPU"), nylon, ionomers (e.g., Surlyn), polyvinyl chloride ("PVC") and including blends of two or more of these thermoplastics such as PC and ABS. These materials may contain pigments, additives and/or fillers that contribute any needed cost and/or performance features such as surface appearance, ignition resistance, modulus, toughness, EMI shielding and the like. Selection of the second component material is dependent on obtaining the desired adhesion to the first component and fabric combined with desired processability and finished part appearance and performance.

In general, the dimensions of the molded-on edge-covering component (shown as example dimensions m, n and p in FIG. 5) will depend on the molded part design and degree of precision and accuracy with which the fabric piece can be cut and then be located on the first component. A longer average overlapping dimension, shown as dimension m in FIG. 5 (i.e., overlapping a larger fabric area adjacent the edges), may be needed in order to compensate for (and more consistently provide perfect edges if there is) greater variability in the fabric piece dimensions, cutting irregularities in the fabric edges and/or variability in location of the fabric piece in the mold. In general, for most fabric types and molded part designs, the average overlapping distance needs to be at least 0.1 millimeters (mm), preferably at least 0.2 mm, more preferably at least 0.3 mm and most preferably at least 0.5 mm. It should also be noted that varying and/or significantly greater overlapping distances may be employed for certain desired part aesthetics such as logos molded onto the edge of the fabric surface or the like. In such cases the overlapping distances of such aesthetics surfaces would obviously not be used to "calculate" an average overlap distance, only the designed or target overlap distance for the overlapping areas where edge-covering alone was the goal.

The thickness of the overlapping layer of the edge-covering component (shown as example dimensions n and p in FIG. 5) is determined by the desired dimensions (e.g., "thinness") and overall design of the finished part. Where a thicker overlapping layer is desired, this can be affected by the ability to provide the proper dimensions for a larger volume flow leader since the volume of the flow leader cavity or channel will generally need to be greater than the volume of the edge-covering cavity (which cavity provides the overlap distance and thickness of the component). In general, for most fabric types and molded part designs, the average edge-covering layer thickness needs to be at least 0.2 millimeters (mm), preferably at least 0.3 mm, more preferably at least 0.5 mm and most preferably at least 0.7 mm. It should also be noted that varying and/or significantly greater thickness may be employed for the edge-covering component for certain desired part aesthetics such as molded-on logos or the like. As with the overlap distances discussed above, in such cases the thickness of such aesthetic surfaces would obviously not be used to "calculate" an average thickness, only the designed or target thickness for the overlapping layer areas where edge-covering alone was the goal.

The second or edge-covering component is provided or applied in a molding process (as opposed to use of adhesives or fasteners) to the first molded component (having a fabric surface piece sufficiently adhered or laminated) with a thermoplastic melt bonding at the desired surface location. Suitable molding processes for producing the finished part according to this invention include injection molding, compression molding, reaction injection molding ("RIM"), radio frequency (RF) welding, sonic welding, thermoforming, injection compression molding, gas assist injection molding, structural foam injection molding, microcellular foam molding technology, laminar injection molding, water injection molding, external gas molding, shear controlled orientation molding, and gas counter pressure injection molding. It is preferably provided as the second injection or shot in a "two shot" molding process or injection molded as the second step in an insert injection process, as are both described above. In providing the second component as the second injection or shot in a "two shot" molding process, the first component with adhered fabric piece is retained in or on one of the mold parts and a cavity for the second shot is then provided by either (a) moving in at least one different mold part, (b) moving the first mold part to a position opposing a different mold part, or (c) the use of sliding or movable section in the mold to provide a further cavity.

Alternatively, the insert injection molding process, the first molded component having an adhered or laminated fabric surface piece is prepared in one set of mold parts, removed, and transferred to a second mold for injection molding the second component. The second mold is designed in such a way that it comes in contact with the first molded component as needed and forms a cavity corresponding to the desired molded-on, edge-covering component.

In either of these situations where the second component is added in an injection molding step in commercially desirable high injection rates and pressures, the first component, the molds and the tooling to add the second component have to be designed to reduce or eliminate "stripping" and "tunneling". "Stripping" is the tendency of the molten resin to penetrate under the fabric edge and for the fabric then to be separated from the first component during this molding step, particularly when second shot material flows parallel to the fabric edge and, when flowing at a sufficiently high rate, contacts the edge/interface. "Tunneling" is when the flowing resin lifts the fabric off from the first molded substrate and/or separates/delaminates the fabric itself and "tunnels" under or through the fabric when the flow front contacts a thick and/or unsupported area of the fabric edge that extends substantially into the flow front of the second shot material, particularly when the fabric edge is contacted in a mostly perpendicular direction. Some fabric materials aggravate this problem when they expand in thickness after removing the first mold cavity after forming the first component and or expand in length under compression in the second molding step. This expansion may cause the fabric to extend (unsupported) into the flow channel for the second molding.

Therefore, when injected into the mold cavity, the flow of second component plastic material needs to be properly directed and controlled so that it flows over and covers the peripheral and/or interior edges of the fabric at the boundary or interface area between the fabric and the first component. The injection rate and pressure for the second component obviously need to be optimized and as high as possible to provide the proper combinations of mold filling, part aesthetics and molding cycle time. Simultaneously, the fabric surface piece has to be properly sized, cut and located relative to the second material flow front to further avoid these problems.

To help reduce or eliminate these situations in a second injection molding step, novel mold and part designs and combinations of designs were developed to reduce the likelihood of plastic material flowing parallel at a high rate over the fabric edge/interface or close to it. Normal thermoplastic part design requires that the nominal thickness of the part or part wall to be generally uniform. This is done to produce uniform plastic material filling throughout the part. Otherwise, the molten injected plastic will preferentially flow into the larger sections where there is less resistance to the flow. In contrast, the part/mold design developed and preferably used according to the present invention uses a non-uniform wall thickness to provide a larger cross-sectional flow area that serves as a "flow leader" or provides a flow leader effect. A flow leader channel is shown as channel 83 in FIG. 4 (with dimensions X and Y) along with correspondingly smaller cross-sectional flow areas at the fabric edges (referred to as fabric edge cavities and shown as channel 82 with dimensions X' and Y' in FIG. 4). The flow leaders or the flow leader effects are designed and provided in such a way that the second shot material flows initially from the gate into the cavity and tends to flow preferentially along and through the main flow channel or flow leader and does not initially enter the fabric edge cavity section. In this way the main flow front of the injected molten plastic flows parallel to but removed from the fabric edge/interface to fill a large portion of the cavity volume. The plastic does not initially flow into the fabric edge cavity area or over or in contact with the fabric edge/interface but fills more gradually and/or at a non-parallel angle into the lower volume fabric edge cavity section, covering the fabric edges with less parallel flow shear force. Preferably, this flow is directed over the edge/interface at a reduced rate and/or in a non-parallel orientation closer to perpendicular to the edge, preferably between 20 degrees and 90 degrees relative to the interface. This reduces or eliminates the problems of fabric stripping, tunneling or other dislocation or removal due to parallel and/or high rate flow over the interface. If using a flow leader channel, the cross-sectional area of the of the flow leader needs to be at least 10% greater than the cross-sectional area of the cavity area that is providing the edge-covering component over the fabric edge areas in order to obtain these benefits and reduce fabric "stripping".

Another way to effectively provide a flow leader effect is to create a "flow restrictor" that narrows and restricts the flow path of the molten resin as it goes to the area of the fabric edges (peripheral or internal) from the main flow channel. Preferably the flow restrictor is provided by the first molded substrate component as a molded-in or molded-on rib or profile at the appropriate location, as shown in FIGS. 3, 4 and 5, identified as feature (22). The flow restrictor technique is especially beneficial when using a fabric that expands after the molding of the first component and the removal/change of the first mold cavity. Upon its expansion, the fabric edges may not be well adhered to the first component and/or be loose at some points. The flow restrictor then creates a flow leader effect and guides the second molding material initially along the channel (shown as 83' in FIG. 4) and then into the edge cavity area (shown as 82' in FIG. 4) and onto the top of the fabric in a more perpendicular direction. The flow restrictor should be located close to the fabric edge/interface, typically within about 4 millimeters (mm). The height of the flow restrictor relative to the fabric in the fabric edge cavity needs to be sufficient that the fabric is protected from the flow and shear as the main body of molten plastic flows in the flow leader or main flow channel area of the cavity (83' in FIG. 4) in a generally parallel direction. In this way the plastic flow forces in the fabric edge cavity (82' in FIG. 4) will not separate or delaminate the fabric from the substrate and/or internally delaminate the fabric itself. Typically the flow restrictor needs to be high enough to sufficiently divert molten plastic flow over the fabric edge, preferably the restrictor is higher than the height of the fabric in the fabric edge area of the cavity.

Another way to eliminate the fabric from being stripped from the first molding is to incorporate a cavity design that directs the flow of the injected second material generally perpendicularly off of an "impingement" surface on the mold and onto the fabric surface at the fabric periphery (as opposed to flowing against and onto the fabric in a generally coplanar direction). This design uses a flow channel/cavity having at least one sharp angle in the flow path to cause the injected, molten second material to contact the mold wall opposite the fabric surface (i.e., the impingement surface) before contacting the fabric surface and subsequently flowing over the fabric edge in a fashion that does not force or tear it away from the first substrate part. This is shown in FIGS. 4 and 5 where the mold impingement surfaces are identified as (23).

The use of multi-component molding requires that a second mold cavity come in contact with the front aesthetic surface of the fabric prior to and during the molding of the second component. In molding the second component, proper measures are needed to avoid problems related to the destructive crushing of the fabric surface texture as well a preventing the second material "flashing" or "tunneling" outside of the intended second cavity area. "Flashing" can result in forming layers or pieces of second plastic material that lie on the fabric surface while "tunneling" allows plastic material to flow under the fabric or through the fabric material itself. Both effects are problems and create a surface flaw on the fabric surface when the part is removed from the mold. Special design techniques must be utilized which minimizes the aesthetic impact on the fabric surface. In this regard, a second mold cavity surface should be designed that sufficiently compresses, preferably tightly pinches or crushes the fabric surface area to a point that the second molding injection will not flash plastic material between the cavity/fabric interface but without destructively crushing the fabric. It has been found that this cavity surface preferably compresses or crushes the fabric back to at least the thickness it had when compressed under molding pressure in the original cavity, depending upon the viscosity and injection pressure of the second molding material.

Another preferred design technique to help minimize flashing or tunneling of this type is a so-called "crush rib", shown in FIGS. 4 and 5 as (81). In this embodiment of the invention, the second component mold cavity (80) should be designed such that there is a projection or rib in the area at or near the fabric edge and going all the way around the edges of the fabric surface where it is to be overlapped with the edge-covering component. This rib will tightly pinch or crush the fabric to a point that the second molding injection cannot flash plastic material between the cavity/fabric interface and may reduce the degree to which the rest of the fabric surface needs to be compressed or crushed. This crush rib is shown in FIGS. 4 and 5 identified as (81). The second cavity "crush rib" should not cut the fabric but should depress or crush the fabric sufficiently, depending upon the nature of the system components such as the fabric, first and second molding materials and second molding conditions. Preferably the crush rib depresses the fabric nearly to the surface of the underlying substrate plastic.

In another embodiment of the present invention where the second edge-covering component will need to cover fabric edges around multiple openings in the fabric-covered surface of the part and it is desired to minimize the injection ports or gates in the mold parts, the flow channels for delivery of the second plastic material to all or part of those fabric edges around the openings are preferably located in the first substrate component, in the back surface or the side opposite the fabric-surfaced side. This is particularly advantageous in that the flow of the second material through these channels can then very readily be directed against impingement surfaces and onto the fabric edges as it is directed outwardly from behind the plane of the fabric surface. Molded-in flow channels are shown in FIGS. 4, 5, and/or 6 identified as (84 and 86).

In alternative embodiments, the second edge-covering component can be provided onto the first component and fabric edges using other known techniques. Using a compression molding process the fabric piece edges can be covered by creating a cavity and providing a thermoset or thermoplastic material. Thermosetting or thermosetable plastics can also be employed to similarly prepare the second edge-covering component using known techniques for reaction injection molding. Using a sonic welding process the second component is molded on by heating the contact surfaces or areas using ultrasonic energy. An edge-covering component can be molded on in a thermoforming process by placing fabric in the thermoforming mold and heating a plastic sheet to a melting and forming temperature then subsequently forming the plastic sheet over the inserted fabric.

EXAMPLES

A part according to the present invention as shown in FIG. 1 was designed and produced generally as shown in FIGS. 1 through 6 and discussed above. The fabric is a non-woven polyester fabric which was laminated with a polycarbonate film 0.005 inches (approx. 0.015 mm) thick by the use of a thermally initiated adhesive, Dow adhesive film. The lamination was conducted at 220 degrees C. (set-point temperature for heating the rolls) on a two-roll laminator. The resulting laminate was pre-cut to the desired size and shape (including internal openings) such that the fabric does not reach the ends or edges of the empty mold cavity when it is inserted into the desired location between the cavity and the core on an injection mold. The desired fabric surface is placed against the cavity and held in place by the use of vacuum. The first injection molded material, a PC/ABS blend, is injected into the mold coming in contact with the PC film. The flow of the injection molded thermoplastic, PC/ABS, provides pressure to the back side of the fabric, sufficient to form the fabric to the shape of the cavity surface. The PC/ABS thermoplastic adheres to the PC film that is on the back side of the fabric and this step provides a substrate component having an adhered fabric material piece having peripheral edges and a surface area.

The part is then removed from the first injection mold and placed into a second injection mold that closes and provides a mold cavity. The closed mold has surfaces that both (a) contact and compress the fabric surface area so that the fabric surface is compressed between the mold cavity and core and (b) leave the fabric edges exposed in the cavity for the flow and molding of the edge-covering component.

The second mold is designed to have a flow leader cavity and a smaller volume fabric edge cavity as shown on the left side of the molding configuration in FIG. 4 going completely around the peripheral fabric edges.

Other part design features include a flow channel cut into the first molding as shown in FIG. 6 that facilitates flow from the single injection gate to the fabric edges around the openings. The design of the flow channel and around the openings is generally shown in FIGS. 3, 4 and 5. As generally shown in FIGS. 4 and 5, the second cavity provides impingement surfaces (23) that, together with the flow of the second material from the molded-in flow channels in the back of the first substrate component, promotes impingement of the molten plastic on the cavity wall. The outward flow from channels (84) directs the second component material flow against the impingement surfaces of the second mold cavity and into the interior edge-covering cavities and onto the top of the fabric and edges from a direction generally perpendicular to the plane of the fabric. This flow of the edge-covering material over the interior fabric edges in this fashion minimizes or eliminates fabric stripping in those sections of the fabric edge. The targeted average overlapping distances varied for the different interior openings and for the edge, ranging from about 0.2 to 2.0 millimeters. The targeted average thickness of the overlapping layer also varied for the different interior openings and for the edge, ranging from about 0.4 to 1.0 millimeters.

Upon opening of the first molds and ejection of the first component from the first molding step, the fabric expands about 0.3 to 0.5 mm from the compressed thickness. In the second molding step there are crush ribs as shown in FIGS. 3, 4 and 5 (81) that compress the fabric thickness to about 0.008 mm less than the compressed thickness during the first molding step.

A second thermoplastic, TPU, is injected into the mold covering and sealing the fabric edge area. When the part is removed from the mold, there is an attractive finished part with a well secured and sealed fabric surface area. The edge cover area having a TPU surface layer has a desirable soft touch feel.

What is claimed is:

1. A process for preparing a molded plastic article having a fabric surface piece comprising the steps of: (a) molding in a first step a substrate component having an adhered fabric material piece having edges and a surface area wherein the molded substrate component extends beyond the fabric edge and is not entirely covered by fabric; (b) molding on in a second step an edge-covering component which overlaps at least part of the fabric edges and fabric surface area adjacent the edges but not covering an area of fabric intended to be at the article surface.

2. A process according to claim 1 wherein the edge-covering component which overlaps the edges of the fabric piece is molded on by injection or compression molding in the second molding step.

3. A process according to claim 1 wherein the edge-covering component which overlaps the edges of the fabric piece is molded on by reaction injection molding in the second molding step.

4. A process according to claim 2 or 3 where the second molding step uses a flow leader effect with (a) a main flow leader cavity for the edge-covering plastic component material which main flow cavity is generally around and outside the area of the peripheral fabric edges and (b) a fabric edge cavity that receives a flow of the edge-covering material in a direction that is generally not parallel to the peripheral edges of the fabric.

5. A process according to claim 2 or 3 where the second molding step uses a flow leader effect with a flow restrictor located on the first step substrate component that maintains the main flow of the edge-covering material in the main channel that is removed from the fabric edge cavity and restricts its flow into the fabric edge cavity to a direction that is generally not parallel to the edges of the fabric.

6. A process according to claim 2 or 3 where molded-in flow channels are provided in the first step substrate component that provide flow of second step plastic material to interior fabric edges around one or more openings or voids in the plastic part.

7. A process according to claim 2 or 3 where there is an impingement surface in the flow channel to direct the second plastic flow from the impingement surface onto the fabric surface and cover the fabric edges.

8. A process according to claim 1 wherein the molded-on, edge-covering component is a plastic selected from the group consisting of thermosetting polyurethane, thermosetting epoxy, thermosetting silicone, and the thermoplastics polycarbonate ("PC"), ABS, polypropylene ("PP"), high impact polystyrene ("HIPS"), polyethylene ("PE"), polyester, polyacetyl, thermoplastic elastomers, thermoplastic polyurethanes ("TPU"), nylon, ionomers, polyvinyl chloride ("PVC") and blends of two or more of these thermoplastics.

9. A process according to claim 1 wherein the fabric is a synthetic leather or suede.

* * * * *